F. H. MERRILL.
TRANSMISSION MECHANISM.
APPLICATION FILED FEB. 3, 1905.
920,363.
Patented May 4, 1909.
3 SHEETS—SHEET 1.
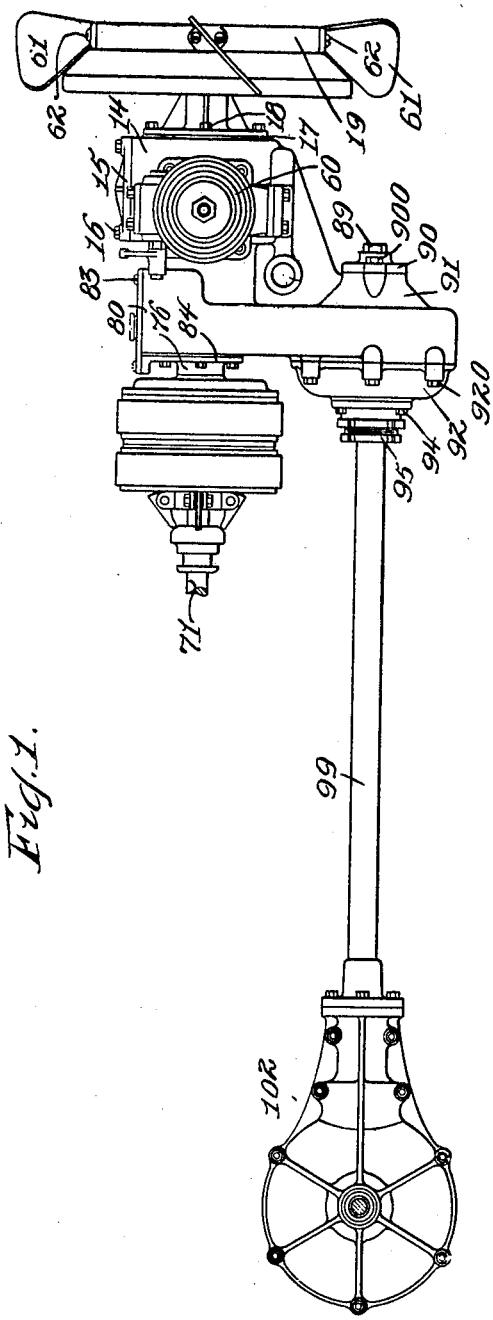
WITNESSES:
INVENTOR
Frank H. Merrill,
BY F. H. Richards,
His ATTORNEY

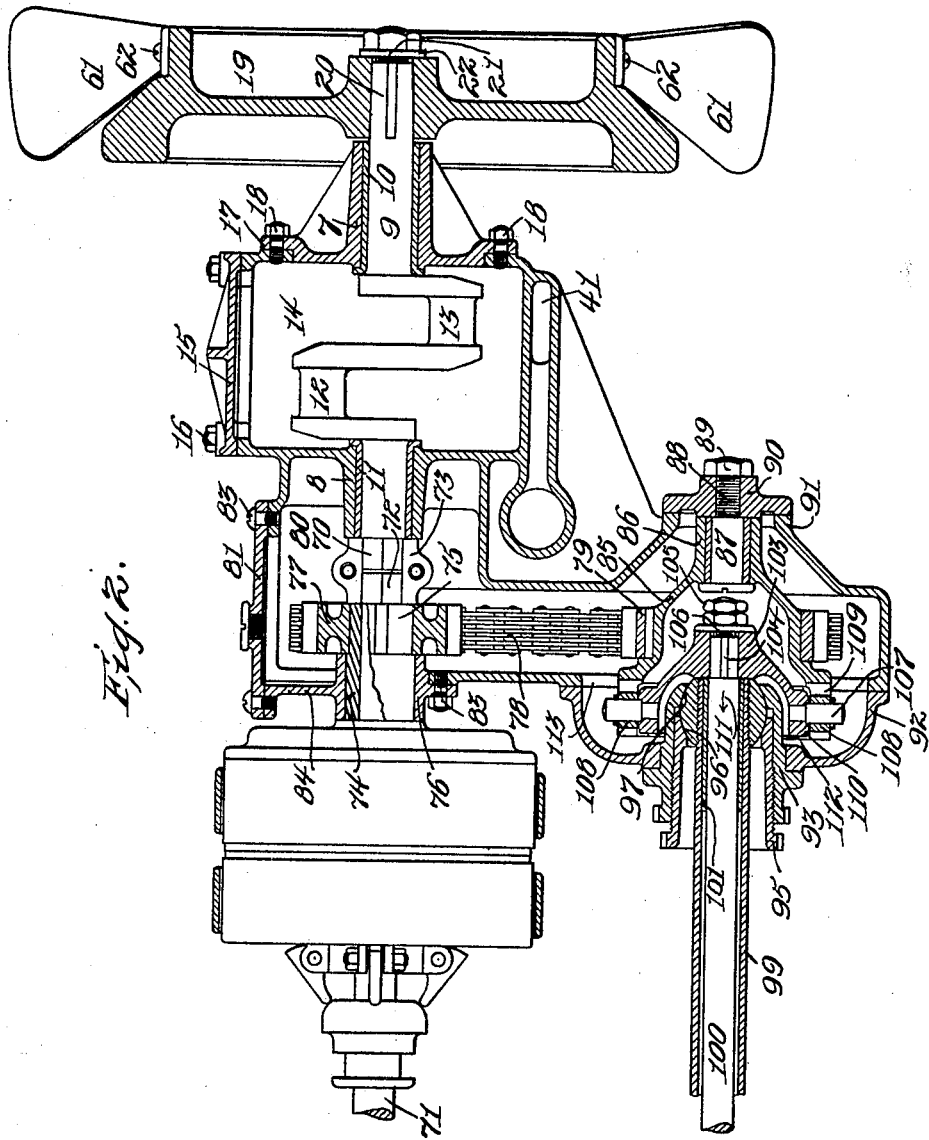

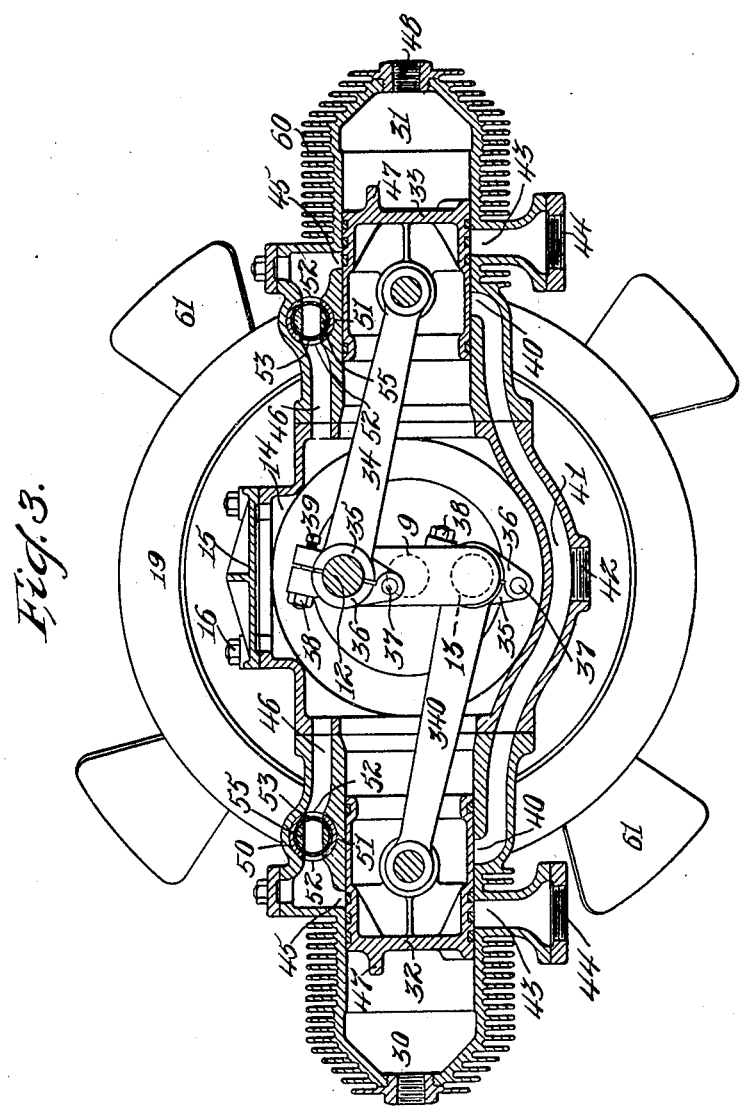

UNITED STATES PATENT OFFICE.

FRANK H. MERRILL, OF PLAINFIELD, NEW JERSEY.

TRANSMISSION MECHANISM.

No. 920,363.  Specification of Letters Patent.  Patented May 4, 1909.

Application filed February 3, 1905. Serial No. 243,985.

*To all whom it may concern:*

Be it known that I, FRANK H. MERRILL, a citizen of the United States, residing in Plainfield, in the county of Union and State of New Jersey, have invented certain new and useful Improvements in Transmission Mechanism, of which the following is a specification.

This invention relates to and has for an object to provide an improved motor and transmission and one which is peculiarly adapted for automobile construction.

In the drawings accompanying and forming a part of this specification Figure 1 is a side view of the motor and its connected parts and the transmission, the connecting shaft and the gear case for the rear connections for the connecting or driving shaft and illustrates one form of practical embodiment of my invention. Fig. 2 is an enlarged vertical section of the right hand side of Fig. 1, and Fig. 3 is a section taken transversely to the section line of Fig. 2. The plane in which the section of Fig. 3 is taken is not a straight line since it is taken at about the center of each of the cylinders such cylinders being adapted to actuate a pair of cranks upon one shaft must have their centers dodged to give them proper action.

It will be seen by reference to the several views that the cylinders, the crank chamber and the transmission case are connected together in such a manner as to form a substantial framework for the various parts, the framework having a pair of bearings 7 and 8 supporting the crank shaft 9. Suitable bushings 10 and 11 may be interposed between the crank shaft and its bearings. The crank shaft has upon it a pair of crank pins 12 and 13. The cranks are inclosed within a crank case, designated in a general way by 14, and which has a cover 15 secured in place by suitable tap bolts 16. The bearing 7 is shown, in the present instance, as having a flange 17 which may be secured to the casing by means of suitable tap bolts 18, thus making it possible to remove the bearing and with it the crank and crank shaft when occasion may demand. The crank shaft is shown as having fast upon it a fly wheel 19 the end 20 of the shaft being shown as tapered and the fly wheel being forced upon it by means of a screw 21 and bur 22.

The motor herein illustrated is of the two-cycle class and is adapted for the use of an explosive mixture of gases and there are illustrated two cylinders 30, 31 which are set on opposite sides of the crank shaft 9 and which have their axial lines in parallelism.
The cylinders with their pistons 32, 33 are arranged in opposed form, and the pistons are by means of their connections adapted to move in exact opposition. In the present instance the working or forward stroke of each piston is toward the crank shaft. The pistons are connected to the crank pins 12 and 13 respectively by means of pitmen 34 and 340, each of which has its eye composed of a fixed member 35 and a movable member 36 hinged thereto by means of a pivoted pin 37, there being a binding screw 38 to bind the sides of such eye together and a set screw 39 to hold the sides apart sufficiently to make clearance enough to afford a working fit at the joint. The crank case is open to the ends of the cylinders and the supply or admission to the crank case or to the forward ends of the cylinders is through ports 40 of a conduit 41 which may be connected at 42 to some suitable source of supply. The proper mixture of gases will be fed through such conduit 41 and when the pistons are in their outward position the ports 40 will be opened and the gases or other fluid will be admitted into the crank case. Upon the inauguration of the forward or working stroke the pistons will close the ports 40 and upon the continuation of the inward or forward movement will to some extent compress the gaseous mixture in the crank case. When each of the pistons nearly reaches the end of its working or forward stroke it will uncover the exhaust port 43 which may be connected by a suitable coupling 44 to a muffler or other device for the disposition of the exhaust fluid and the products of combustion. The continuation of the forward movement of the piston will uncover the port 45 in the conduit 46 leading from the crank case. Upon such opening of the port the charge which is within the crank case and under a certain amount of compression will flow through the port 45 and into the cylinder. A deflector or baffle plate 47 may be carried by the piston to prevent the gaseous mixture as it enters the cylinder from flowing out through the exhaust. Upon the return stroke the port will be closed and then the port 43 will be closed after which the charge within the cylinder will be compressed, and will be ignited by a suitable sparking device, which may be applied at 48, and being no part of the present improvement it is not illustrated.

It will be seen that there are no valves employed in the inspiration and exhaust and that the pistons work in unison both imparting impulses to the crank shaft at the same time, that is, assuming that the device is being run at its speed of highest efficiency. In some instances, however, it may be found desirable, as for instance in starting or going at a slow rate of speed where but little power is required to use only one of the cylinders, or to use one at less than its efficiency to accomplish which the conduits 46 are provided with throttles designated in a general way by 50, which are of a rotary type comprising a cylindrical portion 51 having an opening 52 upon each side. By turning the cylindrical portion in its bearings the conduit may be completely closed or may be open to any degree required.

It frequently happens that fire will pass back through the conduit and into the crank case to avoid which a screen 53 of sufficient fineness to prevent the passage of the flame or burning gas may be placed within the cylindrical part 51 and be held in place by suitable bars 55. This screen thus gives a double screen in the conduit and effectually prevents firing back into the crank case which in some instances may be the mixing chamber for the charge.

The outer sides of the cylinders may be provided with suitable radiation plates 60, and it will be seen that since there are no valves as in the four-cycle motor the plates may cover substantially the entire working portion of the cylinder which may be of even thickness throughout, thus facilitating the radiation of the heat and also preventing distortion from uneven expansion and contraction.

The fly wheel 19 may be provided with a number of blades 61 which may in practice be removably held in place by means of set screws 62. These fan blades coöperate with the normal rush of air passing the motor to drive current of air past the radiation plates 60 and keep the cylinders cool. By this means I am enabled to provide an air-cooled two-cycle motor.

Some suitable form of variable speed transmitting device may be employed. It may be the ordinary planetary construction or any other which is found desirable in practice. So much, however, as is necessary for the present purposes will be illustrated and explained. The shaft 9 is shown as having a square end 70 and the driving shaft 71 of the transmission device is shown as having a squared end 72, both such squared ends entering a coupling member 73. The driven member of such transmission device or shaft is designated by 74 and is shown as having a squared end 75. The shaft 74 and the end 75 are hollow and afford a bearing for the shaft 71 which they surround. The shaft 74 will be supported in a bearing 76. A sprocket wheel 77 is mounted upon the squared portion 75 and is connected by means of a chain 78 with a sprocket wheel designated by 79. The chain illustrated is of the well known silent Rennalds or Morse varieties, although other forms may be used in practice if desired. The transmission is contained within a portion of the casing and frame-work and is designated in a general way by 80 which may be provided with a removable cover 81 held in place by means of set screws and the bearing 76 is also removably secured in place by means of set screws 83, it being carried by a plate 84. The sprocket wheel 79 is carried by a cup shaped member 85 having a hub 86 surrounding a stub shaft 87 fastened by means of a screw threaded stem 88 and set nut 89 to a removable plate 90 which plate will bear upon an outwardly projecting portion 91 of the casing 80, being held in place by bolts 900. At the opposite side of such casing there is secured by bolts 920 a projecting portion 92 to which one side 93 of a ball socket is fastened by means of a flange and set screws 94. The other half of the ball socket is carried by a sleeve member 95 having screw threaded connection with the interior of the member 93. These members respectively have ball socket faces 96 and 97 for receiving a ball 98 fast upon a sleeve 99 for housing the connecting or driving shaft 100. A bushing 101 may be interposed between the ends of the shaft and the casing sleeve to afford a bearing, as it were, for the shaft at that point. The necessity for the ball and socket joint is that the casing and associated parts designated in a general way by 102, will be carried by the rear axle and that there will be an amount of relative movement between such axle and the portions carrying the transmission case and otherwise there would be twisting of the shaft case causing unnecessary friction and probably breakage. The connection between the shaft 100 and the sprocket wheel 79 is in the nature of a universal coupling, that is there is fastened a member 103 which may be in the form of a spider to the end of the shaft 100, the shaft having a squared end 104 to which such spider is fastened by means of set nuts 105 and plate or bur 106. The spider carries a pair of studs 107, each of which has upon it a roll 108, such rolls being received in slots 109 in the member 95 which carries a sprocket wheel. The faces 110 of the portions of the spider which carry studs 107 are rounded, or a portion of a sphere, and are concentric with the ball 98, so that as the sleeve turns on the center which may be designated by 111 for convenience, the shaft will also turn upon the same center, and have a bearing on the cylindrical inner face 112 of the rim of the member 85. When it is desired to take apart the transmission the sleeve 95 will be unscrewed withdrawing the part of the ball socket which it carries from the ball whereupon the sleeve may be slid back upon the shaft, suitable disconnections having been made at the opposite end. Then the member 92 may be disconnected from the case which will then permit the shaft 100 together with the spider 103 to be drawn out of the case, the stub shaft 87 may then be removed from the plate 90 when the sprocket wheel and the member 85 may be raised from the chain and removed through the opening 113. This will then permit the removal of the chain and sprocket wheel 77 after removing the plate 81 provided of course the crank shaft has been removed. Any part of the case may be gotten into and the various parts of the apparatus disassembled without the use of many or peculiar tools.

Having thus described my invention, I claim:

1. A transmission device embodying a sprocket wheel, means to drive the same, a bearing for said sprocket wheel, a spider carried by the same and having channels within it parallel with its axis, a shaft driven by such sprocket wheel and having a spider upon it, a pair of pins carried by such spider and located in said channels.

2. The combination with a sprocket wheel and means to drive the same, a cup shaped member supporting said sprocket wheel and having a hub at one end, a journal supporting said hub at its other end and being provided with slots disposed upon lines parallel with the axle of said journal and having an interior bearing face, a driven shaft, a cup shaped member carried by the driven shaft and within the member carrying the sprocket wheel, arms projecting therefrom, rolls carried by said arms and located in said slots and having a bearing face for the interior bearing face thereof and upon a circle struck from its center, a sleeve casing for such shaft having a ball upon its end, a socket for supporting such ball concentric with the bearing faces upon such shaft.

3. The combination with a sprocket wheel and means to drive the same, a cup shaped member supporting said sprocket wheel and having a hub at one end, a journal supporting said hub at its other end and being provided with slots disposed upon lines parallel with the axis of said journal and having an interior cylindrical bearing face, a driven shaft, a cup shaped member carried by the driven shaft and within the member carrying the sprocket wheel and having a spherical bearing face bearing upon said cylindrical face, connecting members carried by said cup-shaped member and located in said slots, a sleeve casing for such shaft having a ball upon its end, a socket for supporting such ball concentric with the bearing face upon such cup shaped member carried by the driven shaft.

4. A transmission device embodying a sprocket wheel, means to drive the same, a bearing for said sprocket wheel upon one side, a rim upon the other side having an inner cylindrical face and having channels within it parallel with the axis of said bearing, a shaft driven by such sprocket wheel and having a member upon it provided with a spherical bearing face engaging said cylindrical face, and a pair of pins carried by such member and located in said channels.

5. The combination with a shaft, of a universal bearing therefor, comprising a casing sleeve for said shaft and a ball and socket support for said casing sleeve concentric with said bearing.

6. The combination with a shaft, of a universal bearing therefor, comprising a casing sleeve for said shaft, a bushing between the shaft and casing, a ball on said sleeve, and a pair of bearing cups one of which is adjustable for affording a socket for said ball.

7. The combination with a shaft, of a universal bearing therefor, comprising a casing sleeve for said shaft, a ball on said sleeve, a two-part socket for said ball, a member carrying one part of said socket and adjustable toward and from the other.

8. A transmission casing embodying a gear casing having at one side a projecting portion, and a removable cap covering said projecting portion, a removable stud shaft carried by said cap, said casing having an opening opposite said cap and a closure for said opening.

9. A transmission mechanism comprising a casing, journal bearings therein, a shaft supported thereby, a sprocket wheel on said shaft, said casing having an opening adjacent to said wheel, a removable closure for said opening, said casing also having at one side a projecting portion and a removable cap, covering said projecting portion, a removable stud shaft carried by said cap, said casing having an opening opposite said cap and a closure for said opening, a stud shaft carried by said cap, a sprocket wheel, a cup shaped member supporting said sprocket wheel and having a hub at one end mounted on said stud shaft, its other end having a rim provided on its interior face with a cylindrical bearing face, and said rim having in it slots disposed upon lines parallel with the axis of said shaft, a chain connecting said sprocket wheels, a driven shaft, a member fast on said shaft and having a spherical bearing in engagement with said cylindrical face, pins in the same entering said slots, a casing sleeve for said driven shaft, a ball thereon, a socket for said ball embodying a sleeve-like member bearing one part of said socket, and being interiorly screw threaded, and a sleeve like member within the same carrying the other part of said ball socket and being exteriorly screw threaded.

Signed at Nos. 9 to 15 Murray street, New York, N. Y., this 31st day of January 1905.

FRANK H. MERRILL.

Witnesses:
CHAS. LYON RUSSELL,
FRED. J. DOLE.